Jan. 28, 1969  A. ANGER  3,423,793
EXTRUSION HEAD
Filed July 19, 1966
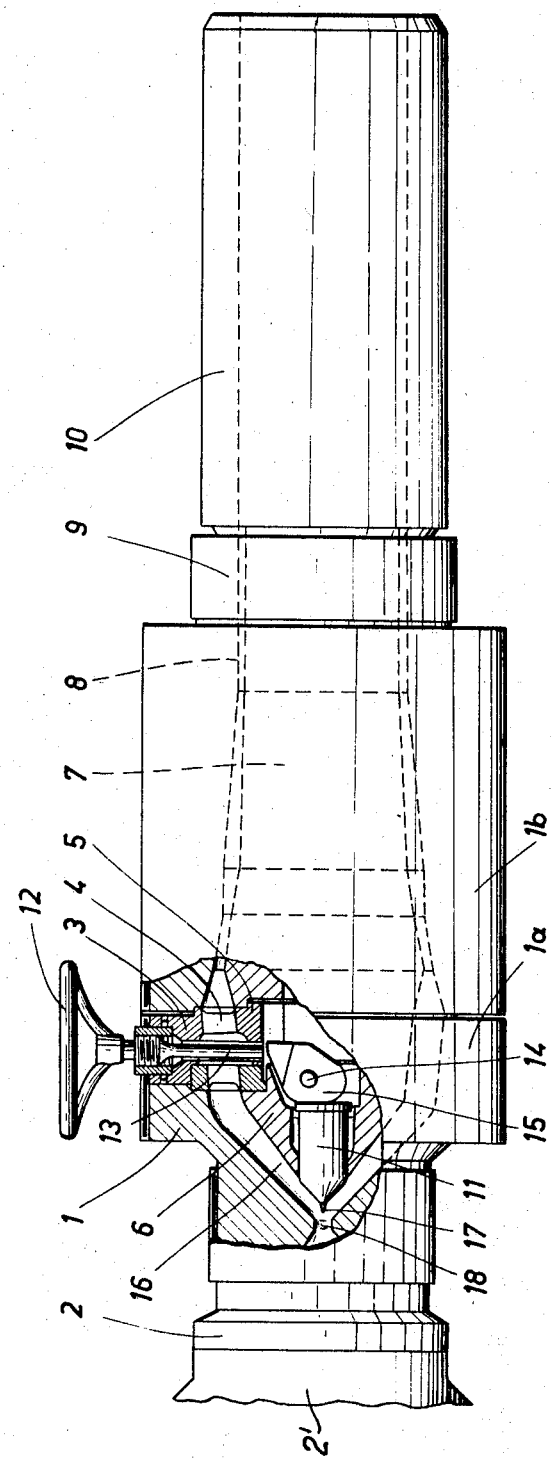

3,423,793
EXTRUSION HEAD
Anton Anger, Auf der Gugl 36, Linz (Danube), Austria
Filed July 19, 1966, Ser. No. 566,293
Claims priority, application Austria, July 29, 1965,
A 7,003/65
U.S. Cl. 18—14    3 Claims
Int. Cl. B29d 23/04

ABSTRACT OF THE DISCLOSURE

An extrusion head for plastic tubing is equipped with a valve member capable of being extended from the mandrel into the inlet orifice of the extruder head by means of a handwheel on a threaded spindle which passes through the housing wall of the head and a hollow radial rib into the interior of the mandrel to actuate a lever against which the valve member bears, whereby flow of plastic into the head may be throttled.

---

This invention relates to an improvement in an extrusion head for screw extruders for plastics materials, which head comprises a housing, which adjoins the screw extruder and contains an extrusion die, which is connected by an inlet passage to the outlet end of the screw extruder.

Extrusion heads of this kind are mainly intended for the processing of plastics materials which are plastic at various temperatures, particularly of synthetic thermoplastics in the manufacture of rigid or flexible tubing or extruded sections.

The extrusion heads are mainly used in connection with screw extruders, in which the material is heated to the predetermined temperature and is kneaded and worked until it has the desired plasticity.

In the known extrusion heads, the extrusion die is connected by an inlet passage and an inlet orifice in the housing to the mouthpiece of the extruder. In each extrusion head, the inlet passage and the inlet orifice of the housing have predetermined dimensions, which are not variable. Where the known extrusion heads are used, different extrusion heads having inlet passages of different size must be employed for materials having different viscosities. The size of the inlet passage of different extrusion heads depends also on the final cross-section of the extrusion.

The invention relates to an extrusion head of the kind mentioned first hereinbefore and resides essentially in that the effective flow section of the inlet orifice is variable because the parts which define said orifice are relatively adjustable and adapted to be fixed in various adjusted positions and/or separate throttling members are provided, which adjustably extend into the inlet orifice.

The design according to the invention enables a change in the size of the inlet passage during the operation of the machine and while the same is at a standstill. This enables a change of the back-pressure exerted by the material in the extrusion head on the extruder so that the plasticity of the material can be influenced during operation and a final product having a particularly good quality can be obtained. The design according to the invention enables also the use of one and the same extrusion head for the processing of materials having different viscosities and an adjustment of the extrusion head to obtain for any material the back-pressure required for the desired plasticity.

The invention may be embodied in various designs. To change the size of the inlet orifice, radially and/or axially adjustable parts may be provided in the housing and/or the die core. A preferred design for use with extruders for tubing having a die core which is held by ribs in the housing resides according to the invention in that a plug or the like is inserted in the inlet end of the die core and said plug is adjustable like a valve needle toward the opposite surface of the housing and is provided, if desired, with an extension, which is movable into the inlet orifice of the housing. That end of the plug which extends into the die core bears preferably on one arm of a bell-crank lever and the other arm of said lever is engaged in an eccentric direction by a spindle for adjusting said lever, which spindle extends outwardly through a hollow rib serving to center the die core in the passage of the housing. This design is simple and functionally reliable. Due to the mounting of the spindle in the rib, the adjusting device does not adversely affect the flow of material in the die. During operation, the driving engagement between the adjusting spindle, the bell-crank lever and the plug is maintained by the pressure exerted on the plug by the material in the inlet passage.

An extrusion head according to the invention is shown in side elevation, partly in section, in the accompanying drawing.

The extrusion head shown comprises a housing 1, which is sealed by a mounting flange 2 to the mouthpiece 2' of a screw extruder press, not otherwise shown. The housing 1 consists of at least two parts 1a, 1b, between which a retaining ring 3 is gripped, which is connected to a die core 6 by ribs 4 and an inner ring 5. The die core 6 may also be composite. At its outlet end, the die core 6 forms a mandrel 7, which together with the inside wall 8 of the housing defines the annular outlet orifice of the housing 1. A die 10 for sizing the tubing is connected to the extrusion head 1 by a flange 9.

A plug 11 is axially slidably mounted in the inlet end of the valve core 6 and is adjustable like a die needle by a spindle 13 and a bell-crank lever 15. The spindle 13 is threadedly mounted in the housing 1, extends through a hollow rib 4 and is operable by a handwheel 12. The bell-crank lever 15 is mounted on a pivot 14 in the core 6. The relative axial position of the plug 11 determines the size of the inlet passage 16. The plug 11 is provided with an extension 17, which is movable into the inlet orifice 18 of the housing, coaxial with the annular outlet orifice. The size of the inlet passage 16 can thus be adjusted by a rotation of the handwheel 12.

What is claimed is:

1. In an extrusion head for extruding plastic material, the combination of a hollow housing provided with a material inlet orifice communicating with an extrusion press, a die core disposed in said hollow housing coaxially with said inlet orifice and defining an annular passage for material through said housing, said annular passage being of a substantially greater diameter than the inlet orifice and including an inlet end portion which is annularly convergent into communication with the inlet orifice and also including an opposite annular outlet end, a valve plug positioned axially in said die core adjacent the inlet orifice, said valve plug being axially slidable in said convergent inlet end portion of said passage toward and away from said inlet orifice and being of a diameter substantially greater than the inlet orifice whereby sliding movement of the valve plug may significantly vary and selectively stop the rate of flow of material through the orifice and through said convergent inlet end portion of said passage, and adjustable means for retaining said valve plug in a selected position.

2. The device as defined in claim 1 together with a diametrically reduced extension provided on said valve plug, said extension being of a smaller diameter than and receivable in said inlet orifice when the plug is slid in a direction to decrease the flow of material through the orifice and through said inlet end portion of the passage.

3. The device as defined in claim 1 wherein said adjustable plug retaining means comprise a two-arm lever pivotally mounted in said die core with one arm thereof engaging said plug, and a screw-threaded actuating shaft extending radially outwardly from the die core to the outside of said housing, the inner end of said shaft being engageable with the other arm of said lever.

References Cited

UNITED STATES PATENTS

| | | |
|---|---|---|
| 3,134,832 | 5/1964 | Smith. |
| 3,217,360 | 11/1965 | Mason et al. |
| 3,256,563 | 6/1966 | Criss et al. |
| 3,314,107 | 4/1967 | Honstrater. |
| 3,327,350 | 6/1967 | Limbach. |

WILLIAM J. STEPHENSON, *Primary Examiner.*

U.S. Cl. X.R.

18—12